United States Patent [19]

Shumway

[11] Patent Number: 4,875,232
[45] Date of Patent: Oct. 17, 1989

[54] TELEPHONE POWER DISTRIBUTION AND ISOLATION SYSTEM

[76] Inventor: Mark P. Shumway, 230 W. 2950 South, Salt Lake City, Utah 84115

[21] Appl. No.: 213,910

[22] Filed: Jun. 30, 1988

[51] Int. Cl.4 .......................................... H04M 19/08
[52] U.S. Cl. .................................. 379/413; 379/412; 307/17; 361/104
[58] Field of Search ................... 307/17, 23, 112, 125, 307/150; 361/107, 104, 119; 379/413, 322

[56] References Cited

U.S. PATENT DOCUMENTS

| | | | |
|---|---|---|---|
| 2,993,148 | 7/1961 | Pywell | 361/104 X |
| 3,307,096 | 2/1967 | Lyon | 307/17 X |
| 4,073,003 | 2/1978 | Chambers | 307/17 X |
| 4,626,697 | 12/1986 | Nelson | 307/17 X |

Primary Examiner—James L. Dwyer
Attorney, Agent, or Firm—B. Deon Criddle

[57] ABSTRACT

A telephone power isolation system that will provide fused AC or DC power for multiple individually isolated telephone circuits using a single AC powered inlet and a multiple pair telephone connector for output connections. LED indicators are provided to illuminate and indicate a blown fuse condition that can be remotely observed and immediately identified.

1 Claim, 1 Drawing Sheet

TELEPHONE POWER DISTRIBUTION AND ISOLATION SYSTEM

BRIEF DESCRIPTION

1. Field of the Invention

The invention relates to low voltage power distribution systems for telephones.

2. Prior Art

Telephone systems involving multiple telephone circuits and requiring auxillary low voltage power are generally electrically powered from conventional, available AC circuits, and include a transformer or plurality of transformers to convert the AC line power to low voltage AC or DC power. In general however, such systems monopolize existing AC power outlets at the work station and often require installation of additional AC power line taps. Also, the physical arrangement of AC power outlets, transformers and connections to the telephone circuits generally makes installation of the system difficult and time consuming and requires the use of both electrician and communications trained personnel. Furthermore, in the prior known installations with which I am familiar should a multiple output source experience a blown fuse it is often difficult and time consuming to identify and replace or repair the appropriate faulty telephone equipment.

OBJECTS OF THE INVENTION

Principal objects of the present invention are to provide in a single wall mounted panel multiple low voltage AC or DC outputs, each electrically isolated from one another, each separately fused and equipped with a related LED indicator which illuminates to identify a "blown fuse" and all connected to a single telephone type (twenty-five wire pair) connector for easy connection at a wall board connecting block arrangement in the telephone equipment room or selected equipment mounting area.

FEATURES OF THE INVENTION

Principal features of the invention include groups of individual telephone power circuits, with each group having a transformer with an AC input winding and a separate AC output winding for each individual telephone circuit. An indicator type fuse is provided in each telephone circuit between the output winding and the output connector. A red LED is electrically connected to be illuminated in the event the fuse blows.

The telephone output connector provides for an inexpensive means of releasing, but securely connecting to the telephone circuits.

Additional objects and features of the invention will become apparent to those skilled in the art to which the insertion pertains from the following detailed description and drawing.

THE DRAWING

In the drawing:

FIG. 1 is a top plan view of a Telephone Fuse and Power Panel of the invention.

FIG. 2, an end elevation view;

FIG. 3, a schematic diagram of the AC output electrical system; and

FIG. 4, a schematic of the DC output electrical system of the invention.

DETAILED DESCRIPTION

Figure 1:
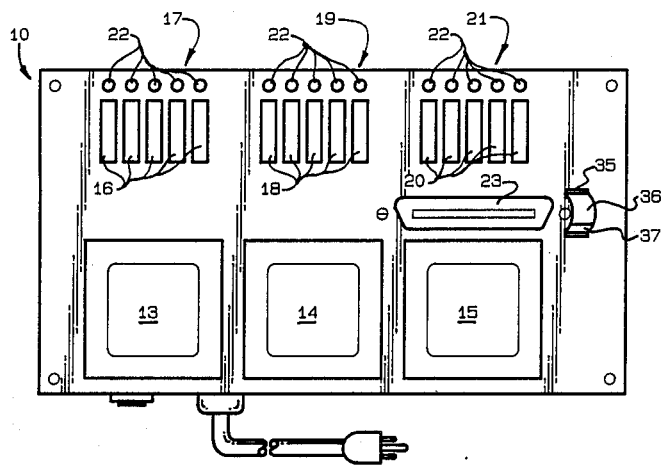
Figure 3:
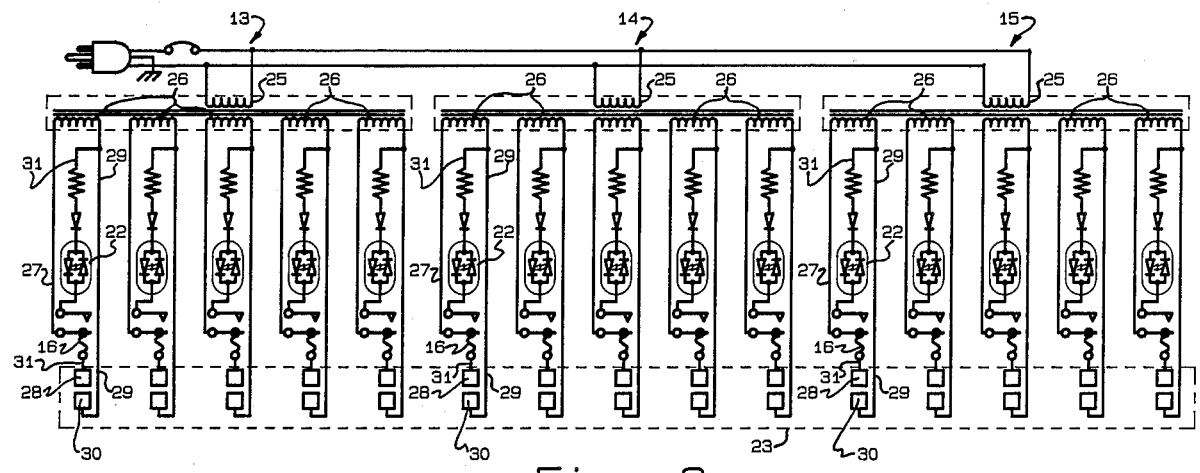

Referring now to the drawing:

In the illustrated preferred embodiment of FIG. 3, the telephone fuse and power panel of the present invention is shown generally at 10 as arranged to provide an AC output.

The panel 10 includes a box-like housing 11 having a top face 12.

The top face 12 has a plurality of transformers 13, 14 and 15; a plurality of five fuses 16 forming a fuse group 17; a plurality of fuses 18 forming a fuse group 19; and a plurality of fuses 20 forming a fuse group 21. An LED 22 is provided adjacent each fuse and projects through the top face 12 and a standard multiple pair telephone connector 23 is provided to extend through the face 12.

Figure 2:
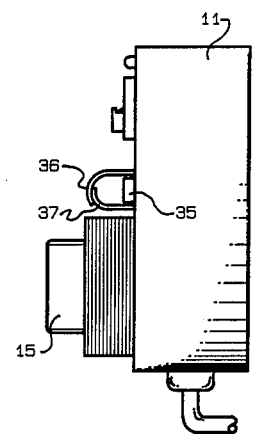

The circuitry for an AC power output panel 10 is shown in FIG. 2. As shown, each of the transformers 13, 14 and 15 has a single input winding 25 and five output windings 26, i.e., one for each fuse of the group of fuses associated with the particular transformer. Each winding 26 has one side connected through a line 27 and associated fuse 16, 18 or 20 to one pin receptacle 28 making up a pair of pin receptacles of the multiple pair telephone connector. The other side of each winding 26 is connected through a line 29 to the other pin receptacle 30 of the said pair of pin receptacles.

A connector line 31 also connects line 29 to LED 22 (preferably a red colored LED) that is arranged to illuminate when an adjacent fuse (16, 18 or 20) blows.

A band 35 of flexible strap material is fixed to top surface 12 adjacent to the multiple pair telephone connector 23. One end of the strap has hooked material 36 thereon and the other side has loop material 37 so that the ends can be adjustably connected together around a cable (not shown) adapted to be connected to the connector 23.

It will be apparent that while only three transformers and associated circuitry for each transformer have been shown, additional such transformers and circuitry can be added if desired.

Figure 4:
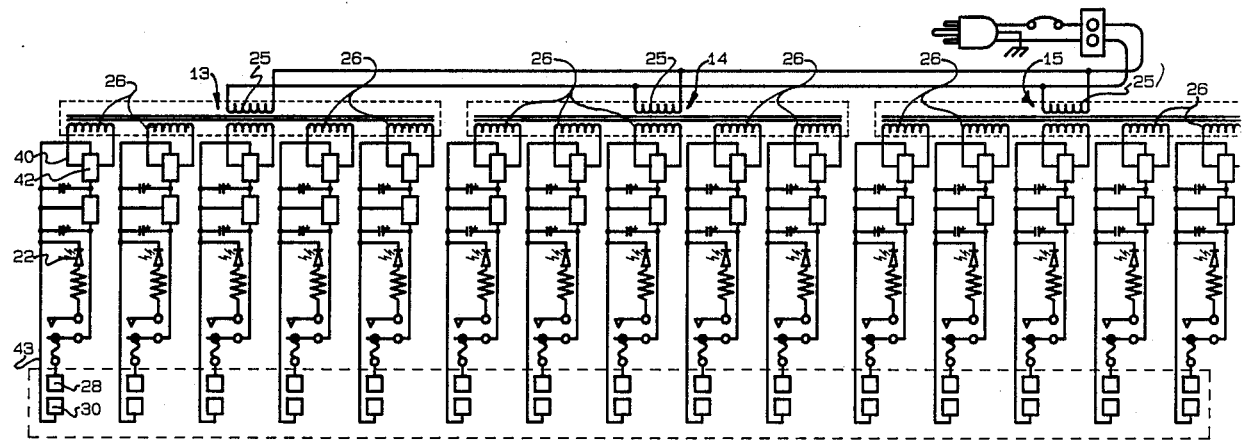

Another embodiment of the invention, employing a rectifier Bridge (42), a terminal voltage regulator and filter capacitors is shown in FIG. 4. In this embodiment, (having a D.C. output voltage), the circuitry is the same as previously described in connection with FIG. 3, except that the output windings 26 are connected by lines 40 and 41 to a bridge rectifier 42. Line 43 then connects a 3 terminal voltage regulator and filter capacitors to the bridge rectifier 42 and to a pin receptacle 30 and line 44 connects the output of the 3 terminal voltage regulator, through a fuse, i.e., 16, 18 or 20 to the other pin receptacle 28 making up the pair of pin receptacles of the multiple pair telephone connector, as in the previously described embodiment, and LED 22 is illuminated upon failure of the fuse associated therewith.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A telephone power isolation system comprising a housing having a top face;
   at least one transformer having an AC input winding and a plurality of output windings, each said transformer extending through the top face;

a telephone connector having a two pin pair extending through the top face;

electrical connector means including a fuse connecting one side of each output winding to one pin receptacle of said two pin pair and each said face extending through the top face;

electrical connector means connecting the other end of each output winding to the other pin receptacle of the two pin pair;

an LED adjacent each fuse, with each said LED being electrically connected to the electrical connector means connecting the other end of each output winding to the other pin receptacle and arranged to turn on upon breaking of the circuit through said adjacent fuse and extending through the top face;

means carried by the top face to releasably secure a cable connected to the telephone pin connector, and means including a pair of adjustably interconnectable flexible straps; and each of said transformers and its associated fuses and LED's being group together through the top face and independently grouped from each other transformer and its associated fuses and LED's.

* * * * *